United States Patent
Zhang et al.

(10) Patent No.: US 11,031,858 B2
(45) Date of Patent: Jun. 8, 2021

(54) VOICE COIL MOTOR

(71) Applicant: TRIPLE WIN TECHNOLOGY (SHENZHEN) CO. LTD., Shenzhen (CN)

(72) Inventors: Long-Fei Zhang, Guangdong (CN); Shin-Wen Chen, New Taipei (TW); Yu-Shuai Li, Shenzhen (CN); Kun Li, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/916,292

(22) Filed: Jun. 30, 2020

(65) Prior Publication Data

US 2020/0336059 A1   Oct. 22, 2020

Related U.S. Application Data

(62) Division of application No. 16/122,980, filed on Sep. 6, 2018, now Pat. No. 10,763,734.

(30) Foreign Application Priority Data

Aug. 7, 2018 (CN) .......................... 201810892810.0

(51) Int. Cl.
- *H02K 41/03* (2006.01)
- *H02K 41/035* (2006.01)
- *G03B 13/34* (2021.01)
- *G02B 7/04* (2021.01)
- *H02K 11/02* (2016.01)

(52) U.S. Cl.
CPC ........... *H02K 41/0356* (2013.01); *G02B 7/04* (2013.01); *G03B 13/34* (2013.01); *H02K 11/02* (2013.01)

(58) Field of Classification Search
CPC ...... H02K 41/0356; H02K 11/02; G02B 7/04; G03B 13/34; G03B 13/36
USPC .................................................. 310/12.16, 43
See application file for complete search history.

(56) References Cited

U.S. PATENT DOCUMENTS

| 8,867,151 B2 * | 10/2014 | Wang ................. H02K 41/0356 |
| | | 359/824 |
| 2012/0307140 A1 * | 12/2012 | Wang ....................... G02B 7/08 |
| | | 348/374 |

FOREIGN PATENT DOCUMENTS

| CN | 102916552 A | 2/2013 |
| CN | 103345032 A | 10/2013 |
| CN | 205720829 U | 11/2016 |

* cited by examiner

*Primary Examiner* — Thanh Lam
(74) *Attorney, Agent, or Firm* — ScienBiziP, P.C.

(57) ABSTRACT

A voice coil motor includes a base, a housing, a lower-resilient member, a lens frame, a coil, a magnet, an upper-resilient member, an upper cover plate, and a pin arranged on the base. The lower-resilient member, the lens frame, the coil, the magnet, the upper-resilient member, and the upper cover plate are arranged in sequence between the base and the housing. The lens frame and the coil are integrally formed. The coil surrounds an outer surface of the lens frame.

9 Claims, 4 Drawing Sheets

VOICE COIL MOTOR

CROSS-REFERENCE TO RELATED APPLICATIONS

This is a divisional application of patent application Ser. No. 16/122,980, filed on Sep. 6, 2018, assigned to the same assignee, which is based on and claims priority to China Patent Application No. 201810892810.0 filed on Aug. 7, 2018, the contents of which are incorporated by reference herein.

FIELD

The subject matter herein generally relates to voice coil motors, and more particularly to a voice coil motor having a coil integrally formed with a lens frame.

BACKGROUND

Voice coil motors are used in electronic devices, such as digital cameras and mobile phones, to drive motion within the electronic device. As electronic devices become smaller, voice coil motors need to be made smaller. However, as voice coil motors become smaller, a lens frame of the voice coil motor becomes more fragile.

Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
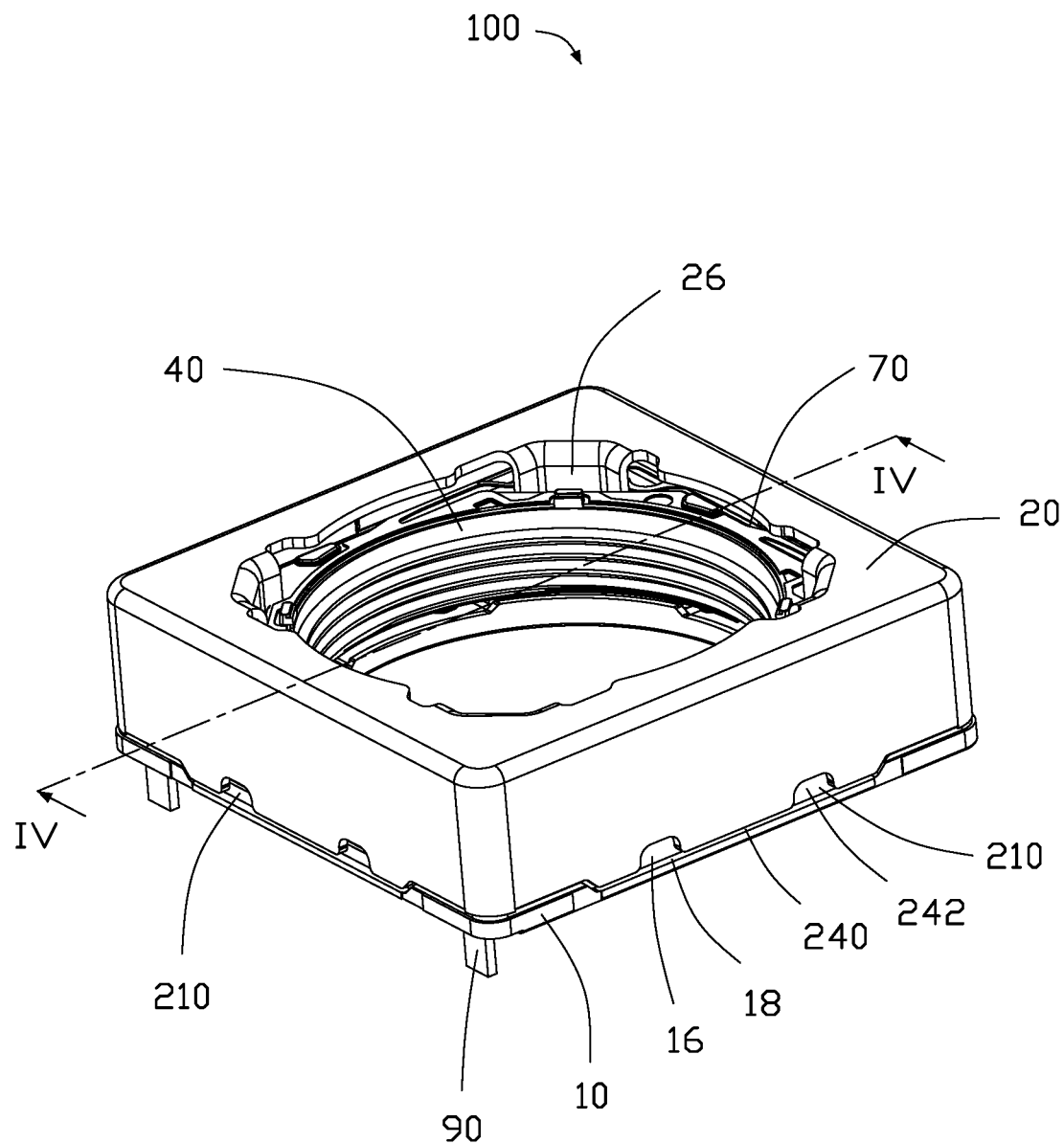
FIG. 1 is an assembled, isometric view of an embodiment of a voice coil motor of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better show details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIGS. 1-4 show an embodiment of a voice coil motor 100. The voice coil motor 100 includes a base 10, a housing 20, a lower-resilient member 30, a lens frame 40, a coil 50, a magnet 60, an upper-resilient piece 70, an upper cover plate 80, and pins 90.

Figure 2:
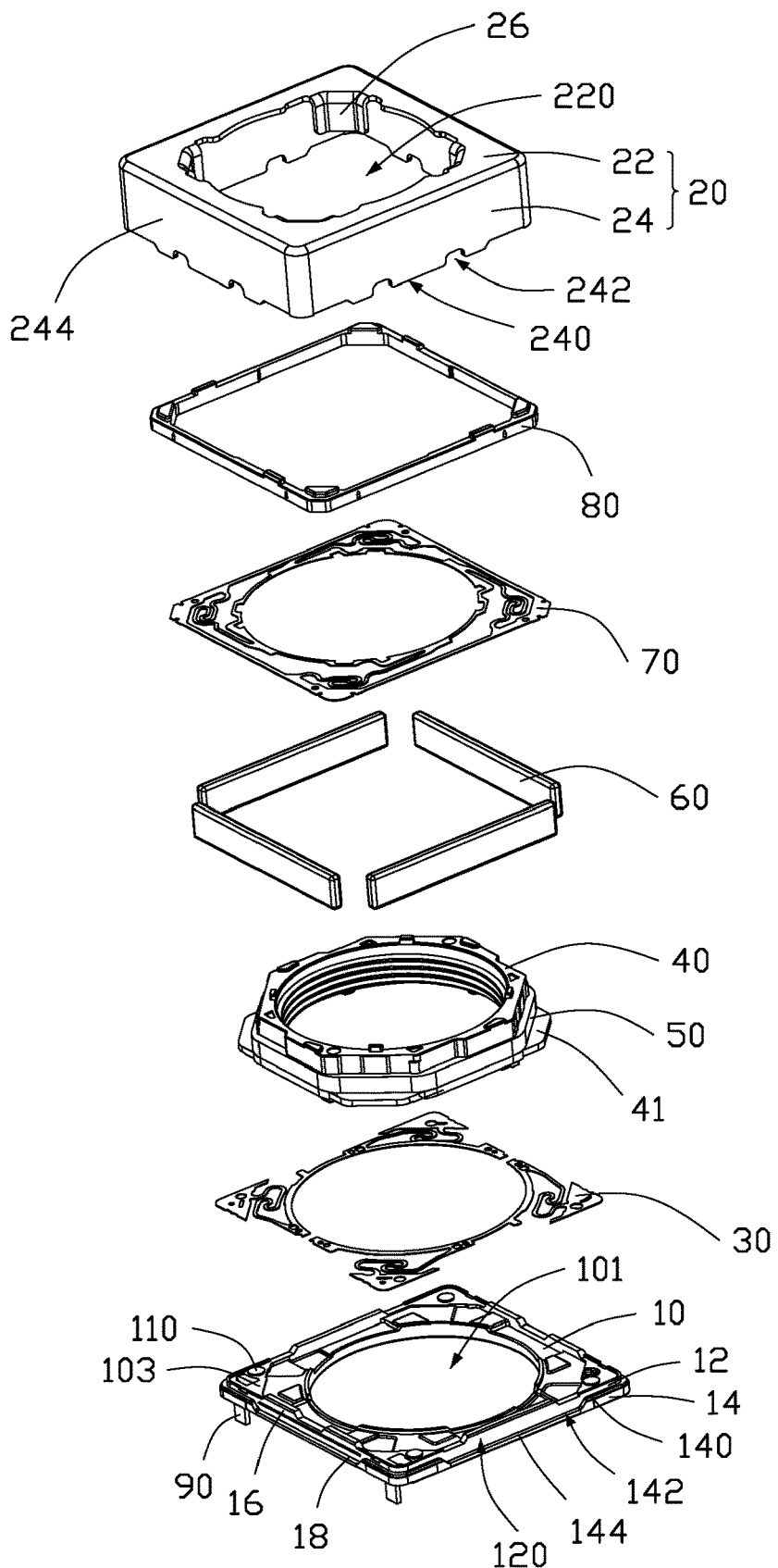
FIG. 2 is an exploded, isometric view of the voice coil motor in FIG. 1.

FIG. 2 shows the base 10 is substantially rectangular. A central portion of the base 10 defines a light hole 101. The light hole 101 allows light to pass through to allow an image sensor (not shown) situated below the base 10 to receive the light for forming the image. The base 10 includes a sidewall 12 and an outer flange 14 coupled to an outer side of the sidewall 12. The sidewall 12 includes four perpendicularly interconnected sidewall surfaces 120. The outer flange 14 extends perpendicularly from the sidewall surface 120.

The outer flange 14 of the base 10 includes an upper end surface 140 perpendicular to each sidewall surface 120. The upper end surface 140 is concavely recessed at a central area of each sidewall surface 120. Thus, the outer flange 14 defines a concave portion 142. The concave portion 142 includes a step surface 144 parallel to the upper end surface 140.

The sidewall surface 120 has a first strengthening piece 16 formed thereon. The step surface 144 has a second strengthening piece 18 formed thereon. The first and second strengthening pieces can be made of metal.

In an embodiment, the first strengthening piece 16 and the second strengthening piece 18 are integrally formed with the sidewall surface 120 and the step surface 144, respectively, by insert molding. When the base 10 is formed by insert molding, the first strengthening piece 16 and the second strengthening piece 18 are embedded in the base 10. The first strengthening piece 16 and the second strengthening piece 18 strengthen the base 10.

The base 10 further includes an upper surface 103 perpendicular to each sidewall surface 120. The upper surface 103 includes guiding projections 110 protruding therefrom. The lower-resilient piece 30 is arranged on the guiding projections 110.

One side of the guiding projections 110 defines two through holes 105. The two through holes 105 receive the pins 90. The pins 90 are configured to be electrically coupled to an external circuit board.

The housing 20 is made of metal, such as iron. The housing 20 made of metal is able to reduce external electromagnetic interference of the voice coil motor 100 and prevent the voice coil motor 100 from electromagnetically interfering with the operation of external electronic components thereof. The housing 20 includes a top wall 22 and a side wall 24 perpendicularly extending from a periphery of the top wall 22. The top wall 22 defines a light transmission hole 220. The top wall 22 and the side wall 24 cooperatively define an accommodating space 201 to accommodate therein the lower-resilient piece 30, the lens frame 40, the coil 50, the magnet 60, the upper-resilient member 70, and the upper cover plate 80. A lower end 240 of the side wall 24 away from the top wall 22 defines a notch 242.

In one embodiment, the housing 20 is substantially rectangular. The side wall 24 includes four perpendicularly interconnected sides 244. Each side 244 defines at least one notch 242.

In one embodiment, each side 244 defines two spaced apart notches 242.

The housing 20 further includes a plurality of connecting pieces 26. In at least one embodiment, a shape of each connecting piece 26 matches a shape of a corresponding corner of the housing 20. Each connecting piece 26 extends from the top wall 22, through the light transmission hole 220, and toward the base 10, and each connecting piece 26 is situated in a corresponding corner of the housing 20.

When the housing 20 is arranged on the base 10, the notches 242 reveal a portion of the first strengthening piece 16 and a portion of the second strengthening piece 18. The revealed portions of the first strengthening piece 16 and the second strengthening piece 18 have soldering zones 210 formed thereon. A laser or solder are used to solder the soldering zones 210 to attach the base 10 and the housing 20 together, so that the housing 20 and the base 10 do not separate from each other. After soldering the soldering zone 210, the voice coil motor 100 is turned over to face the base 10 upwards, and an adhesive is provided on the voice coil motor 100. The adhesive flows into spaces in between the base 10 and the housing 20 to further strengthen attachment of the base 10 and the housing 20.

The lower-resilient piece 30, the lens frame 40, the coil 50, the magnet 60, the upper-resilient piece 70, and the upper cover plate 80 are all received within the accommodating space 201.

The lower-resilient piece 30 is fixed onto the guiding projections 110 of the base 10.

Figure 3:
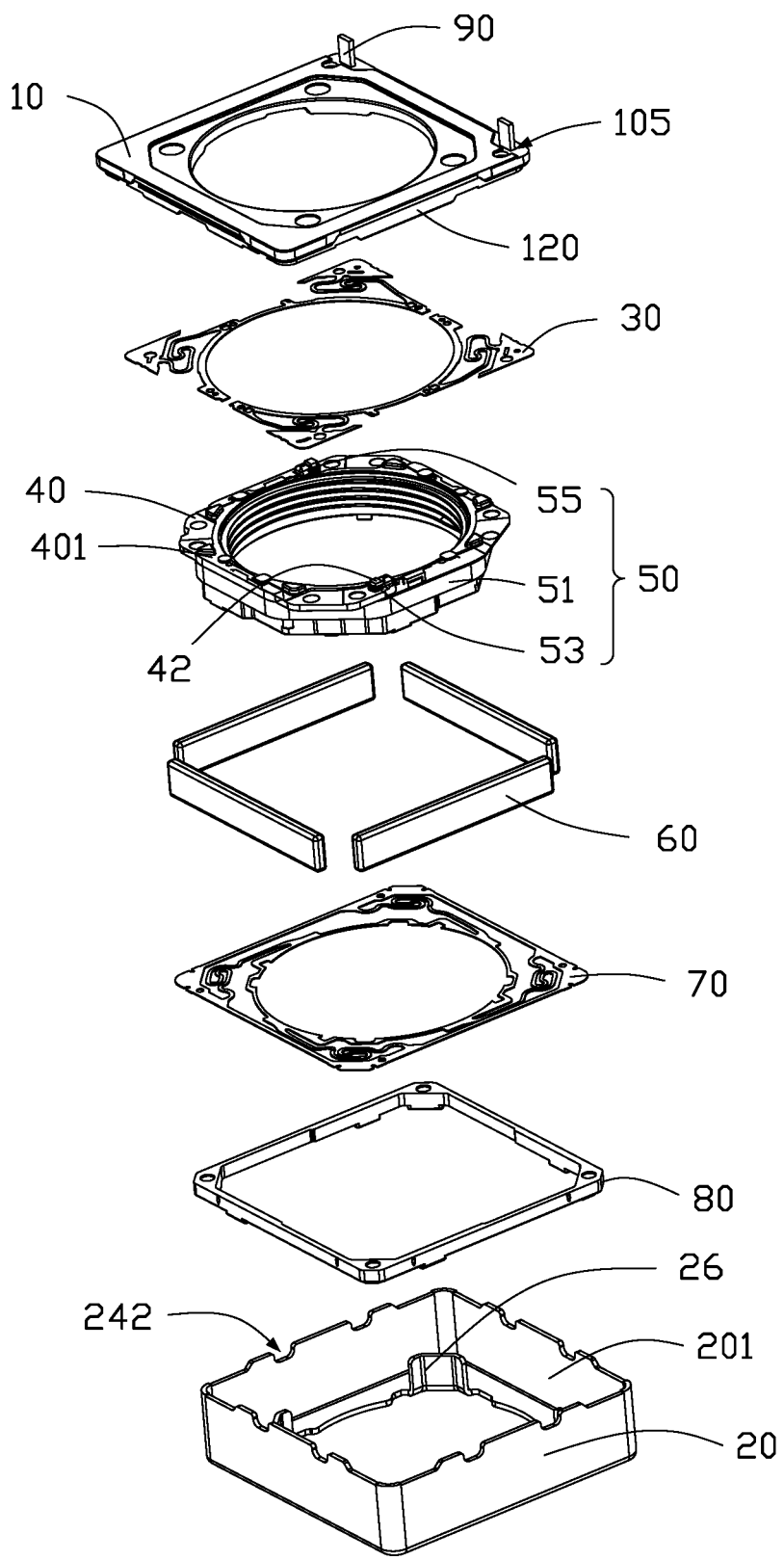
FIG. 3 is similar to FIG. 2, but showing the voice coil motor from another perspective.

FIG. 2 shows the lens frame 40 includes an annular step 41 surrounding an outer surface of the lens frame 40. FIG. 3 shows a bottom surface 401 of the lens frame 40 includes two fixing columns 42.

The coil 50 is formed around the outer surface of the lens frame 40. The coil 50 includes a coil body 51 and a first winding portion 53 and a second winding portion 55 coupled to the coil body 51. The first winding portion 53 and the second winding portion 55 are respectively sleeved on a corresponding one of the fixing columns 42 to fix the coil 50 to the lens frame 40.

Figure 4:
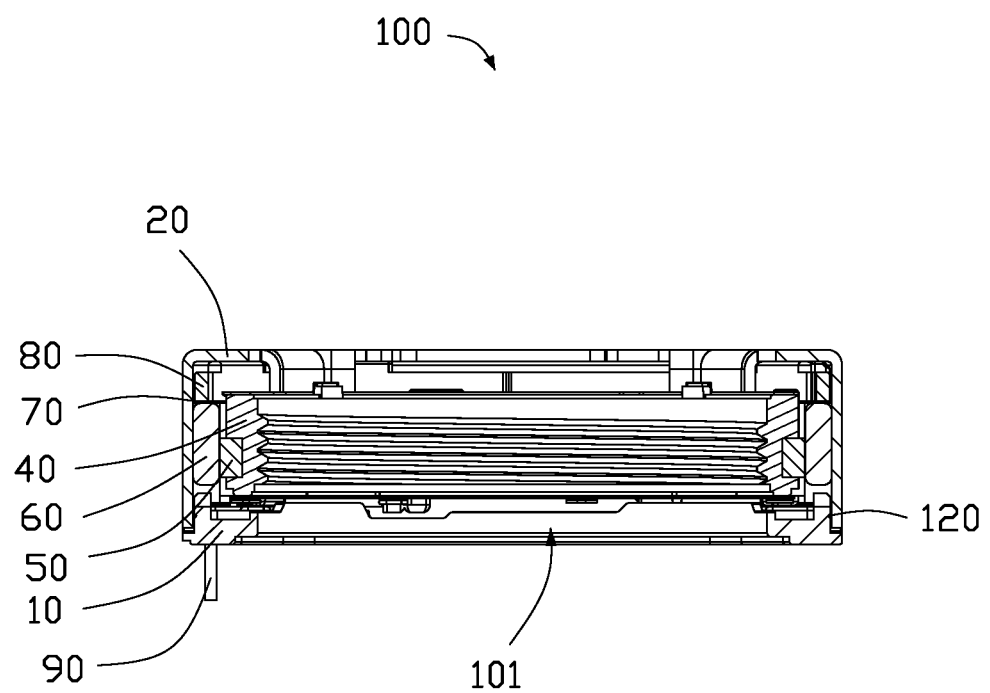
FIG. 4 is a cross-sectional view of the voice coil motor in FIG. 1 taken along line IV-IV.

FIG. 4 shows the coil 50 is integrally formed onto an outer surface of the lens frame 40 by insert molding embedding the coil 50 in the frame.

Integrally forming the lens frame 40 with the coil 50 helps to stabilize a torsion force of the lens frame 40 to reduce risk of deformation of the lens frame 40. Additionally, integrally forming the coil 50 with the lens frame 40 helps to prevent a head end and tail end of the coil 50 from exposing and fraying copper wire of the coil 50. Furthermore, integrally forming the lens frame 40 with the coil 50 reduces a thickness of the lens frame 40, and a size of the voice coil motor 100 is reduced.

The magnet 60 includes a plurality of individual magnets arranged around the coil 50. In one embodiment there are 4 magnets 60, one magnet for each side of coil 50. The upper cover plate 80 is substantially rectangular. The upper-resilient piece 70 is fixed between the upper cover plate 80 and an upper surface of the lens frame 40.

The coil 50 conducts a current to generate magnetic induction with the magnets 60 to cause the coil 50 to move relative to the magnets 60. The lens frame 40 and the coil 50 serve as a moving part. The magnets 60 drive the lens module to move up and down to optically focus the lens module.

When the voice coil motor 100 is in use, the lens module is installed within the lens frame 40. The voice coil motor 100 is installed on a circuit board having an image sensor so that the light transmission hole 220 faces the image sensor. The voice coil motor 100 is used to drive the lens module to move up and down to adjust focus.

A method of making the voice coil motor 100 includes the following steps.

At step S1, coil 50 is provided.

At step S2, the coil 50 is placed within an injection mold of the lens frame 40, and the lens frame 40 is formed in the injection mold. Therefore, the coil 50 is directly fixed on an outer surface of the lens frame 40.

At step S3, four first strengthening pieces 16 and four second strengthening pieces 18 are placed within an injection mold of the base 10. The base 10 is formed in the injection mold, and the first strengthening piece 16 and the second strengthening piece 18 are integrally formed on the sidewall surface 120 and the step surface 144, respectively, of the base 10.

At step S4, two pins 90 are placed within the base 10.

At step S5, the base 10, the lower-resilient member 30, the lens frame 40, the magnets 60, the upper-resilient member 70, and the upper cover plate 80 are stacked on top of each other in sequence between the housing 20 and the base 10.

At step S6, a laser or solder is used on the soldering zone 210 of the base 10 and the housing 20 to solder the base 10 and the housing 20, thereby preventing the housing 20 from separating from the base 10.

In detail, when the housing 20 is attached to the base 10, a portion of the first strengthening piece 16 and a portion of the second strengthening piece 18 are revealed. The revealed portions of the first strengthening piece 16 and the second strengthening piece 18 have formed thereon the soldering zone 210. A laser or solder are used on the soldering zones 210 to solder the soldering zones 210 to fix the base 10 and the housing 20 together.

At step S7, after the soldering zones 210 are soldered, adhesive is applied between the base 10 and the housing 20. The adhesive flows into spaces between the base 10 and the housing 20 to fix the base 10 and the housing 20. Thus, the base 10 and the housing 20 coupled together are strengthened.

The voice coil motor 100 as described above uses the lens frame 40 integrally formed with the coil 50. The lens frame 40 integrally formed with the coil 50 helps to stabilize a torsion force of the lens frame 40 to reduce risk of deformation of the lens frame 40. In addition, the coil 50 integrally formed with the lens frame 40 helps to prevent a head end and tail end of the coil 50 from exposing and fraying copper wire of the coil 50. Furthermore, the lens frame 40 integrally formed with the coil 50 reduces a thickness of the lens frame 40, and a size of the voice coil motor 100 is reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A voice coil motor comprising:
a base;
a housing;
a lower-resilient member;
a lens frame;
a coil;
a magnet;
an upper-resilient member;
an upper cover plate; and
a pin arranged on the base; wherein:
the lower-resilient member, the lens frame, the coil, the magnet, the upper-resilient member, and the upper cover plate are arranged in sequence between the base and the housing;
the lens frame and the coil are integrally formed;
the coil is embedded on and surrounds an outer surface of the lens frame;
wherein the base comprises a sidewall comprising a first strengthening piece fixed thereon; the housing comprises a top wall and a side wall perpendicularly extending from a periphery of the top wall; the side wall defines a notch; the housing is arranged on the base; the notch reveals a portion of the first strengthening piece forming a soldering zone.

2. The voice coil motor of claim 1, wherein the lens frame and the coil are formed by injection molding.

3. The voice coil motor of claim 1, wherein the base and the housing are fixed together by spot-soldering the soldering zone.

4. The voice coil motor of claim 1, wherein a central portion of the base defines a light hole; the sidewall comprises four perpendicularly interconnected wall surfaces; each of the wall surfaces has formed thereon a corresponding one of the first strengthening piece.

5. The voice motor of claim 1, wherein the base further comprises an outer flange extending perpendicularly from a sidewall surface of the sidewall, the outer flange defines a concave portion having a second strengthening piece fixed thereon, the notch further reveals a portion of the second strengthening piece to form the soldering zone.

6. The voice motor of claim 5, wherein the first strengthening piece and the second strengthening piece are embedded in the base.

7. The voice coil motor of claim 1, wherein the top wall defines a light transmission hole, the housing further comprising a plurality of connecting pieces, a shape of each of the plurality of connecting pieces matches a shape of a corresponding corner of the housing, each of the plurality of connecting pieces extends from the top wall, through the light transmission hole, and toward the base, and is situated in a corresponding corner of the housing.

8. The voice coil motor of claim 1, wherein the upper-resilient piece is fixed between the upper cover plate and an upper surface of the lens frame, the lower-resilient piece is fixed onto guiding projections protruding from an upper surface of the base.

9. The voice coil motor of claim 1, further comprising an adhesive infilling space between the base and the housing.

* * * * *